United States Patent [19]

King

[11] Patent Number: 5,163,652
[45] Date of Patent: Nov. 17, 1992

[54] CLAMP AND ROD HOLDER ASSEMBLY

[76] Inventor: Paul F. King, 7788 Dunmore Rd., Woodbury, Minn. 55125

[21] Appl. No.: 767,414

[22] Filed: Sep. 30, 1991

[51] Int. Cl.⁵ .............................................. A01K 97/00
[52] U.S. Cl. .................................... 248/538; 248/515; 248/231.6; 43/21.2
[58] Field of Search ............ 248/538, 515, 535, 316.6, 248/534, 539, 231.6, 74.4; 24/486, 569; 43/21.2

[56] References Cited

U.S. PATENT DOCUMENTS

| | | | |
|---|---|---|---|
| 1,333,258 | 3/1920 | Kahl | 248/535 X |
| 2,475,193 | 7/1949 | Miller | 43/21.2 X |
| 2,542,253 | 2/1951 | King | 43/21.2 |
| 2,994,501 | 8/1961 | Barnard | 248/231.6 |
| 4,093,171 | 6/1978 | Mengo, Sr. | 248/515 |

FOREIGN PATENT DOCUMENTS

| | | | |
|---|---|---|---|
| 173946 | 3/1935 | Switzerland | 248/231.6 |
| 544618 | 4/1942 | United Kingdom | 248/68.1 |

Primary Examiner—Alvin C. Chin-Shue

[57] ABSTRACT

The invention is a clamp and fishing rod holder assembly which can be attached to the gunwale of a boat. The clamp has two parts with a pin in hole assembly and can be used independently of the rod holder. The rod holder has a base and a hollow tube and can be mounted onto the clamp.

1 Claim, 2 Drawing Sheets

CLAMP AND ROD HOLDER ASSEMBLY

SUMMARY AND BACKGROUND OF THE INVENTION

The invention is a clamp which clamps to the extruded gunwale of an aluminum boat or to the square gunwale of a pontoon boat. The clamp can be used in conjunction with a fishing rod holder which mounts on top of the clamp and swivels in any direction, or it can be used independently to hold the downrigger board used in salmon fishing to the boat.

Clamps presently on the market are much larger and clamp to the side of the boat rather than the gunwale. Major advantages of the present invention over the prior art are that it can be attached without drilling holes into the boat and without scratching the paint, because the gunwale is unpainted.

Rod holders presently on the market have steel pins which fit into any of several holes, thus allowing for eight different positions. An advantage of the present invention is that it can swivel in a 360 degree arc and thus can be put into any position desired.

DESCRIPTION OF THE PREFERRED EMBODIMENT OF THE INVENTION

Figure 1:
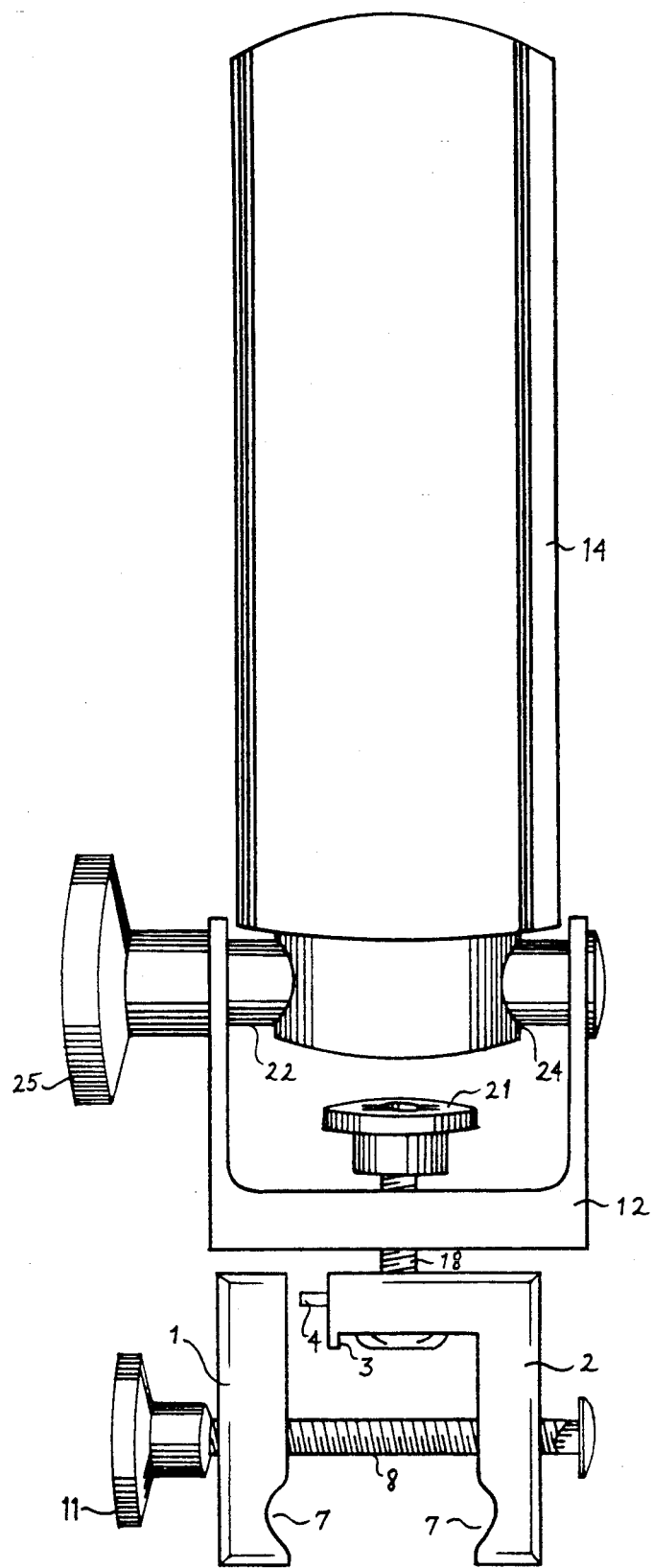
FIG. 1 is a front view.
Figure 2:
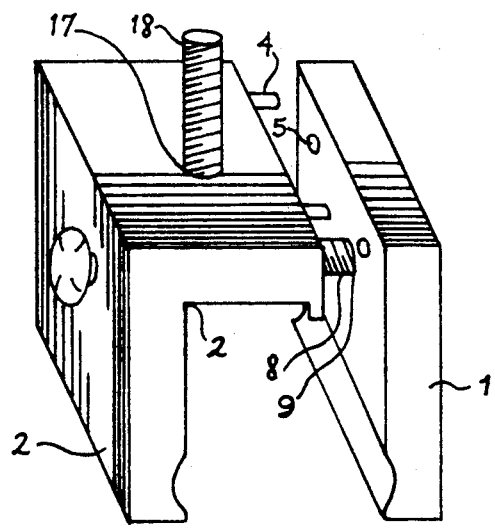
FIG. 2 is a perspective view of the clamp.
Figure 3:
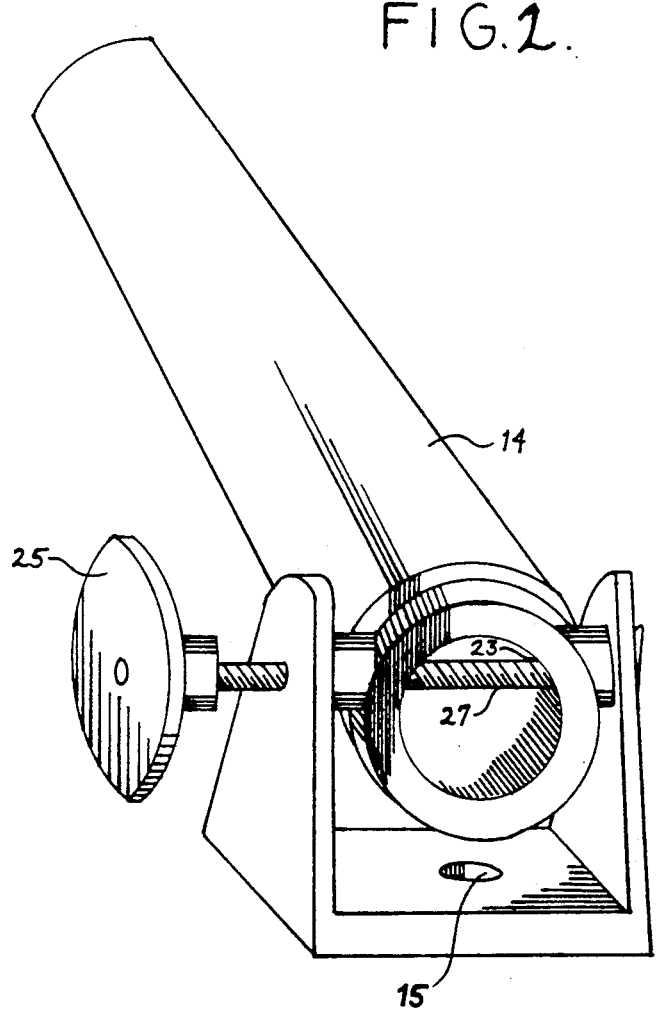
FIG. 3 is a perspective view of the rod holder.

The clamp has two main pieces: a vertical piece 1 and a right-angled piece 2 which has a vertical side and horizontal top. The horizontal part of piece 2 has an extension 3 which has two pins 4 protruding from it. The pins 4 fit into corresponding holes 5 drilled through piece 1. Pieces 1 and 2 each have a horizontal groove 7 running along the lower interior surface. A bolt 8 is disposed horizontally through openings 9 in pieces 1 and 2, and is held on by nut 11.

The clamp fits onto the gunwale of the boat so that the gunwale fits between the grooves 7 in pieces 1 and 2, the bolt 8 rests upon the top of the gunwale, and the clamp is tightened so that the pins 4 of piece 2 fit into the holes 5 of piece 1.

The rod holder comprises a U-shaped base 12 and a hollow tube 14. The base 12 has an opening 15 in its bottom horizontal portion which aligns with opening 17 in the top of piece 2 of the clamp. A bolt 18 is disposed vertically through openings 15 and 17 and is held on by nut 21. The base 12 of the rod holder can swivel 360 degrees arount bolt 18.

A bolt 27 is disposed horizontally through openings 23 in the upper part of the sides of base 12 and through openings 24 in the lower part of tube 14. Bolt 27 is held on by nut 25. A plastic projection 22 on either side surrounds bolt 27 from the sides of base 12 to the base of tube 14. The tube 14 can swivel in a 180 degree are around bolt 27. The fishing rod fits into tube 14 and is held in place by bolt 27 and nut 25.

All bolts are preferrably made of stainless steel to avoid rusting and all other parts are preferrably made of unbreakable plastic. The plastic nuts are hand-tightened. All openings can be made as square notches rather than round openings to allow for easier tightening of nuts and bolts.

The clamp can be used independently of the rod holder in order to hold downrigger boards onto the gunwale of the boat. In this mode, four clamps, two on each side of the boat, are used to attach the downrigger boards to the gunwale.

I claim:

1. A clamp and rod holder assembly adapted to fit onto the gunwale of a boat, said assembly comprising:
   a clamp having a first piece which is vertical and which has holes formed through it, and a second piece which has a horizontal top and a vertical side formed at right angles to each other, said horizontal top having pins projecting from it which fit into said holes of said first piece when said clamp is tightened into closed position;
   said first piece and said second piece of said clamp each having a longitudinal arcuate groove formed into its interior surface;
   a bolt disposed horizontally through openings in said first piece and said second piece of said clamp and secured by a nut;
   a rod holder having a generally U-shaped base which is mountable on top of said clamp by means of a bolt disposed vertically through openings in said base and said second piece of said clamp, said bolt being secured by a nut, said base being capable of swiveling 360 degrees around said bolt and being secured at any position along its are, and a hollow tube projecting vertically from said base, said tube being secured by a bolt disposed horizontally through openings in the sides of said base and secured by a nut, said tube being capable of swiveling 180 degrees around said bolt and being secured at any position along its arc.

* * * * *